US012044062B2

(12) United States Patent
Mourchid

(10) Patent No.: US 12,044,062 B2
(45) Date of Patent: Jul. 23, 2024

(54) DOOR RAIL SYSTEM

(71) Applicant: C.R. Laurence Co., Inc., Los Angeles, CA (US)

(72) Inventor: Naoufel Mourchid, Los Angeles, CA (US)

(73) Assignee: C.R. LAURENCE CO., INC., Los Angeles, CA (US)

( * ) Notice: Subject to any disclaimer, the term of this patent is extended or adjusted under 35 U.S.C. 154(b) by 0 days.

(21) Appl. No.: 18/190,905

(22) Filed: Mar. 27, 2023

(65) Prior Publication Data

US 2023/0235617 A1 Jul. 27, 2023

Related U.S. Application Data

(63) Continuation of application No. 16/950,579, filed on Nov. 17, 2020, now Pat. No. 11,613,923, which is a continuation of application No. 16/932,643, filed on Jul. 17, 2020, now Pat. No. 10,871,026.

(51) Int. Cl.

*E06B 3/58* (2006.01)
*E06B 3/54* (2006.01)
*E05D 7/04* (2006.01)

(52) U.S. Cl.

CPC .......... *E06B 3/5864* (2013.01); *E06B 3/5454* (2013.01); *E06B 3/5857* (2013.01); *E05D 7/04* (2013.01)

(58) Field of Classification Search

CPC . E05D 5/00; E05D 7/04; E06B 3/5857; E06B 3/5864; E06B 3/5454; E06B 3/36
See application file for complete search history.

(56) References Cited

U.S. PATENT DOCUMENTS 3,726,043 A * 4/1973 Jentsch .................... E05F 3/00 16/245
4,035,957 A * 7/1977 Roloff .................... A47K 3/286 16/382
4,240,235 A 12/1980 Nawa
4,655,025 A * 4/1987 Marinoni .............. E05D 5/0246 52/777
4,914,888 A 4/1990 Hanson
4,996,740 A * 3/1991 Hales, Sr. ............... E05D 7/081 16/DIG. 43
5,142,737 A * 9/1992 Ferrari .................. E05D 5/0276 16/DIG. 43
5,203,115 A * 4/1993 Marinoni ................ E05D 7/081 16/236
5,444,958 A 8/1995 Lu
6,434,905 B1 8/2002 Sprague (Continued)

FOREIGN PATENT DOCUMENTS

EP 3 940 165 A1 1/2022

*Primary Examiner* — Paola Agudelo

(74) *Attorney, Agent, or Firm* — Cislo & Thomas, LLP

(57) ABSTRACT

An improved door rail system for holding a panel, such as a glass panel, is presented. The door rail system includes a core rail and clamping rails having a wedging geometry so that when the clamping rails are actuated with respect to the core rail, clamping force is applied to the glass panel to secure the panel within the core rail. The improved door rail system accommodates panels of varying thickness, features the use of modular side covers and incorporates a door to door jamb adjustment device allowing for angular adjustments.

2 Claims, 20 Drawing Sheets

(56) References Cited

U.S. PATENT DOCUMENTS

| | | | | |
|---|---|---|---|---|
| 6,912,818 | B2 | 7/2005 | Sprague | |
| 7,380,378 | B2 * | 6/2008 | Clifford | E06B 3/549 52/204.72 |
| 7,584,588 | B2 | 9/2009 | Kim | |
| 7,963,077 | B2 | 6/2011 | Lin | |
| 8,528,169 | B1 * | 9/2013 | Yu | E05D 7/043 16/238 |
| 8,925,258 | B1 * | 1/2015 | Header | E05D 15/00 52/767 |
| 9,074,413 | B1 * | 7/2015 | Sprague | E06B 3/5871 |
| 9,127,474 | B2 | 9/2015 | Tinwala | |
| 9,303,444 | B1 * | 4/2016 | Choi | E06B 3/60 |
| 9,366,382 | B2 | 6/2016 | Bonomi | |
| 9,777,484 | B2 | 10/2017 | Header | |
| 9,816,276 | B2 | 11/2017 | Noble | |
| 10,871,026 | B1 | 12/2020 | Mourchid | |
| 11,060,341 | B1 * | 7/2021 | Sprague | E06B 3/549 |
| 2002/0100234 | A1 | 8/2002 | Sprague | |
| 2002/0195595 | A1 | 12/2002 | Shepherd | |
| 2006/0070318 | A1 | 4/2006 | Chen et al. | |
| 2007/0107351 | A1 | 5/2007 | Garrett | |
| 2008/0236095 | A1 * | 10/2008 | Kim | E06B 3/5454 52/784.16 |
| 2009/0031653 | A1 | 2/2009 | Nash | |
| 2010/0205880 | A1 | 8/2010 | Lin | |
| 2015/0240851 | A1 | 8/2015 | Giacometti et al. | |
| 2016/0160546 | A1 * | 6/2016 | Aykas | E06B 3/02 49/506 |
| 2019/0234134 | A1 * | 8/2019 | Thompson | E06B 3/36 |

* cited by examiner

DOOR RAIL SYSTEM

CLAIM FOR PRIORITY

This application claims priority as a continuation of U.S. application Ser. No. 16/932,643 entitled "Improved Door Rail System," filed on Jul. 17, 2020 and U.S. application Ser. No. 16/950,579 entitled "Improved Door Rail System," filed on Nov. 17, 2020, the contents of both of which are incorporated herein, in their entirety.

BACKGROUND OF THE INVENTION

Field of the Invention

The present invention is directed generally to the field of doors and, more particularly, to an improved rail system for framing a panel for use as a door.

Background Art

Door rail systems are commonly used to hold or frame one or more panels, including glass, metal, fiberglass, wood, vinyl (and other polymers), or composite panels, in a doorway opening. Typically, upper and lower horizontal rails are used to secure a panel at its upper and lower horizontal edges.

In many prior art rail systems, such as those commonly used in the glass doors of large office buildings and shopping malls, the rails are attached to the glass panel using structural adhesives. Such means of attachment make it difficult or impossible to remove the rail from the glass panel, once installed. This is generally considered to be a disadvantage of adhesively attached rail designs as the rail cannot readily be removed for replacement due to scuffing or other damage, or for other needed repair.

For a long time, there was a need in the art for a mechanical means of attaching door rails to panels and several mechanical systems have been proposed. One commercially successful, mechanical rail attachment system is disclosed in U.S. Pat. Nos. 6,434,905 and 6,912,818 entitled "Door Rail System," both of which are owned by Applicant. While the system of Applicant's prior patents has proven successful, it lacks the efficiency of combining cut-to-fit modular side covers with a plurality of standard core rails that, together, are able to span varying doorway widths, the ability to readily accommodate a variety of panel thicknesses without changing multiple components, and the ability to provide angular adjustment of a door with respect to a door jamb or adjacent door. Thus, there remains room for improvement in the art. Preferably, a new system would also include the ability to hold concealed within the rails, additional door hardware such as alignment devices and locking devices.

SUMMARY OF THE INVENTION

The door rail system of the present invention improves upon the door rail system disclosed in U.S. Pat. Nos. 6,434,905 and 6,912,818 by adding new features that, among other things, provide the ability to readily and more efficiently accommodate varying doorway widths using cut-to-fit modular side covers and standard core rails, readily install side covers having a variety of heights, profiles, and finishes, readily accommodate a variety of panel thicknesses, and, provide angular and axial adjustment of a door with respect to a door jamb and adjacent doors. The new door rail system also includes an accessory channel having the ability to hold concealed within the rails, additional door hardware such as alignment devices and locking devices.

The door rail system of the present invention principally comprises at least one core rail, two clamping rails, a pulling rail and one or more clamping bolts. The at least one core rail features a longitudinal clamping channel defined along a longitudinal length of the rail. The clamping channel has mutually opposed right and left inclined surfaces defined in a right and a left side of the clamping channel, respectively. The clamping rails are mounted movably and mutually opposed within the clamping channel for clamping a panel. Each clamping rail has a holding recess for securing the pulling rail, a clamping recess for holding a panel and, an inclined guiding surface where the inclined guiding surface bears on one of the right or left inclined surfaces of the clamping channel.

The clamping recess is defined in one side of each of the clamping rails and has a vertical face. When two clamping rails are installed mutually opposed within the clamping channel, the vertical faces of the clamping recesses face each other, i.e. are also mutually opposed. This mutually opposed configuration of the vertical faces allows the faces to abut and secure opposite faces of a panel. A compression element may be used at the interface of the vertical faces of the clamping channel and the faces of the panel to more uniformly distribute clamping pressure on the panel and to thereby prevent damage to the panel, e.g., cracking of a glass panel or marring of a metal or other panel.

The holding recess is defined in a side of each of the clamping rails and is configured to mate with one or more pulling rails, e.g., the holding recess may have a vertical face and a horizontal face that corresponds with those of one or more pulling rails designed to accommodate varying panel thicknesses. When clamping rails having a vertical face and a horizontal face are installed mutually opposed within the clamping channel, the vertical faces of the clamping recesses are mutually opposed, whereas the horizontal faces are co-planer, i.e. at the same vertical height. The horizontal faces of the clamping recesses bear against a horizontal face of the pulling rail and serve to support the pulling rail within the clamping channel.

The pulling rail includes one or more threaded vertical holes spaced along a longitudinal length of the bar. The core rail includes one or more through-holes spaced along the longitudinal length of the rail. The core rail and the pulling rail are configured such that one or more through-holes in the core rail are vertically aligned with one or more corresponding threaded holes in the pulling rail. One or more clamping bolts are inserted into one or more through-holes in the core rail and each is threaded into the corresponding one or more threaded holes of the pulling rail.

When the one or more bolts are rotated, the pulling rail is pulled in a driven direction, i.e. downwardly in the case of a lower horizontal rail and upwardly in the case of an upper horizontal rail, which in turn causes the clamping rails upon which the pulling rail is secured or rests via the clamping recesses to be pulled or moved in the driven direction within the clamping channel. Due to the inclined guiding surfaces of the clamping rails bearing and sliding upon the respective right and left inclined surfaces of the clamping channel, the clamping rails translate or move inwardly, i.e., towards each other, in a direction perpendicular or transverse to the driven direction, in addition to moving in the driven direction. The inward movement of the clamping rails is resisted by the panel, i.e., the vertical faces of the clamping recesses of the clamping rails bear against the faces of the panel, whether directly or indirectly via one or more compression elements, where substantial clamping force is produced at the interface. The one or more clamp bolts are tightened to secure the panel in the core rail, without damaging the panel. A desirable clamping pressure may be achieved by applying a predetermined amount of torque to the one or more clamp bolts.

An advantage of the door rail system of the present invention is that a wide range of panel thicknesses can be accommodated by changing only the pulling rail of the door rail assembly. In one embodiment, panels within a range of about ⅜-inch thickness to about ¾-inch thickness can be accommodated using the same core rail and clamping rails. Only the pulling rail needs to be specifically sized for each thickness of panel. Another advantage of the door rail system of the present invention is that there is no need to specify different panel heights for different panel thicknesses or rail height requirements because the present invention allows for a constant panel elevation, regardless of panel thickness or rail height, by use of different pulling rails, compression elements, or modular side covers.

Such adjustability with respect to glass panel thicknesses and rail height was not possible with Applicant's prior design. In the prior design, the pulling rail was constrained within a pocket formed by the mutually opposed clamping rails, where the pocket was located below the clamping recess, which consequently limited the width of the pulling rail. In addition, the height of the housing determined the rail height and the elevation of the panel, which meant that taller rail heights required taller housings and other structural changes (e.g., larger clamp rails) and shorter panel heights. In the new design, the pocket for the pulling rail has been eliminated and the pulling rail now resides wholly or partially within the clamping recess of the clamping rails. This reconfiguration greatly expands the range of pulling rail sizes that can be used with the same core rail and clamping rails, which provides an advantage over the previous design. The new design also has the advantage of allowing for constant panel elevations and, therefore, constant panel heights, across varying panel thicknesses and rail heights.

Another advantage of the door rail system of the present invention is modular side covers. Door rails are often covered with cladding to improve the aesthetic appearance of the rails. The cladding may comprise a variety of materials with brushed or polished stainless steel, powder coated or painted steel and anodized, powder coated or painted aluminum, being the most common. Typically, such cladding is permanently attached to door rails with adhesives. Similarly, cladding may be adhered or otherwise affixed to the modular side covers of the present invention, which are easily interchanged without removal of the door.

The door rail system of the present invention incorporates tongue and groove features in the core rail and the side covers which allow for the side covers to be removably attached to the core rail, i.e., the side covers can be slid on and off one or more core rails. As such, side covers having a wide variety of heights, widths, profiles, and finishes can be used with any particular door rail and the side rails can be readily changed out to replace scuffed or otherwise damaged cladding or simply to change the aesthetic appearance of installed doors, as may be desired from time-to-time. In addition, door rail specifications may require, for example, minimum rail heights, tapered rail profiles, or smooth rail surfaces to comply with building codes that are designed to be consistent with various laws such as the federal Americans with Disabilities Act and state disability rights laws in the United States and similar laws in other countries. The modular side covers of the present invention allow for easy compliance with such requirements by simply swapping out one side cover for another using standard cores and cut-to-fit side covers that are easily assembled.

Another advantage of the door rail system of the present invention is the inclusion of an angular adjustment device, installed within the door rail, for providing improved door to door-jamb or, in the case of adjacent doors (e.g., double doors or pair doors), door-to-door adjustment. Previously, such adjustment devices were able to linearly adjust an edge of a door in and out with respect to the door jamb or adjacent door. The adjustment device of the present invention rail system improves upon prior art devices by providing angular adjustment with respect to a pivot axis or swing axis of the door to better align the door to a door-jamb or adjacent door. The angular adjustment device may also be configured to provide for linear adjustment.

Another advantage of the new door rail system is the inclusion of a dovetail slot in an accessory channel which provides the ability to install, concealed within the rails, components configured with a mating dovetail such as alignment devices and locking devices.

The above and other advantages of the improved door rail system of the present invention will be described in more detail below.

DETAILED DESCRIPTION OF THE PREFERRED EMBODIMENTS

Figure 1A:
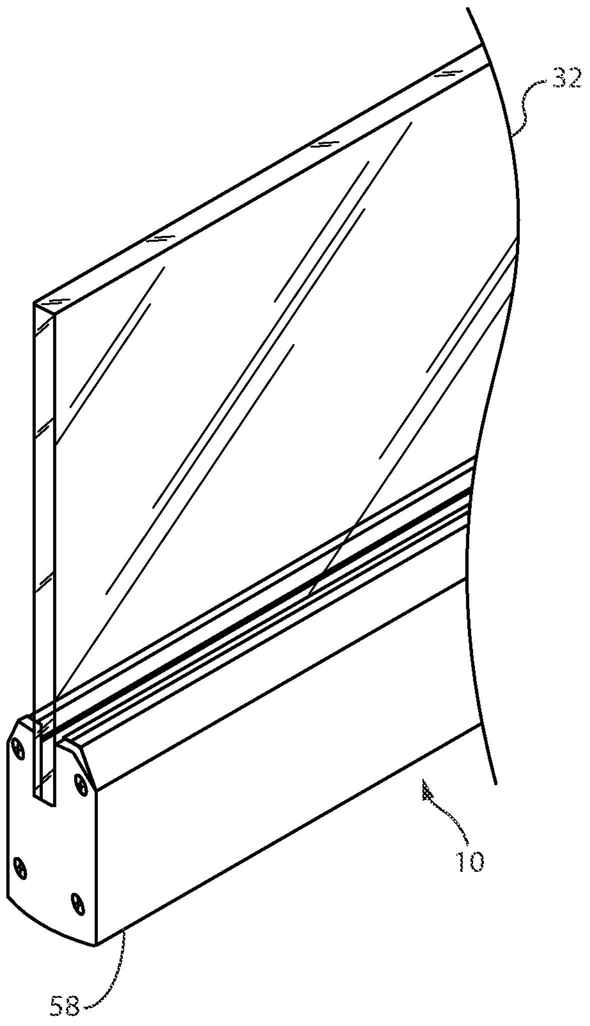
FIG. 1A is a perspective view showing a representative portion of a door rail in accordance with the present invention.

The present invention will now be described more fully hereinafter with reference to the accompanying drawings, in which preferred embodiments of the invention are shown. The invention however, may be embodied in many different forms and should not be construed as being limited to the embodiments set forth herein. Rather these embodiments are provided so that this disclosure will be thorough and complete, and will fully convey the scope of the invention to those skilled in the art. Like numbers refer to like elements throughout.

Wherever used, the terms "comprises," "comprising," "includes," "including," "has," "having," or any other variation thereof, are intended to cover a non-exclusive inclusion. For example, processes, methods, articles, or apparatuses that comprise a list of elements are not necessarily limited to only those elements but may include other elements not expressly listed or inherent to such processes, methods, articles, or apparatuses. Further, unless expressly stated otherwise, the word "or" means the inclusive "or." For example, a condition A or B is satisfied by any one of the following: A is true (or present) and B is false (or not present), A is false (or not present) and B is true (or present), both A and B are true (or present).

With reference to FIGS. 1A-1B, 2A-2D, 3A-3D and 4A-B, the door rail system 10 of the present invention comprises a core rail 12, two clamping rails 14, a pulling rail 16, and one or more clamp bolts or actuation hardware 18. The core rail 12 features a longitudinal clamping channel 20 defined along a longitudinal length 21 (see FIG. 2C) of the core rail 12. The clamping channel 20 has left and right inclined surfaces, 22 and 24, respectively, defined in left and right sides, 26 and 28, respectively, of the clamping channel 20. The clamping rails 14 have a longitudinal length 30 (see FIG. 3D) and are mounted movably and mutually opposed within the clamping channel 20 of the core rail 12 for clamping a panel 32 in place within the core rail 12. Each clamping rail 14 has a holding recess 34 upon which rests the pulling rail 16, a clamping recess 36 for holding a panel 32 and, an inclined guiding surface 38 where the inclined guiding surface 38 bears on one of the left or right inclined surfaces, 22 and 24 of the clamping channel 20.

With reference to FIGS. 1A-1B and 3A-3B, the clamping recess 36 of each clamping rail 14 is defined in one side of each clamping rail 14 and has a vertical face 40. When two clamping rails 14 are installed mutually opposed within the clamping channel 20, the vertical faces 40 of the clamping recesses 36 face each other, i.e., are also mutually opposed. This mutually opposed configuration of the vertical faces 40 of the clamping recess 36 allows the vertical faces 40 to abut and secure opposite vertical faces 42 of the panel 32. A compression element 44, generally in the form of a strip of compressible material may be used at the interface of the vertical faces 40 of the clamping recess 36 and the vertical faces 42 of the panel 32 to more uniformly distribute clamping pressure on the panel 32 and to thereby prevent damage to the panel 32, including cracking of a glass panel or marring of a metal or other panel. In various embodiments, the clamping recess 36 may have a protrusion 41 that helps retain the compression element 44 within the clamping recess 36. To avoid damage to a panel, the protrusion 41 may be sized such that the thickness of the compression element 44, when compressed to the desired, maximum amount, is sufficient to prevent the protrusion 41 from contacting the panel or applying any damaging force to the panel.

Figure 3A:
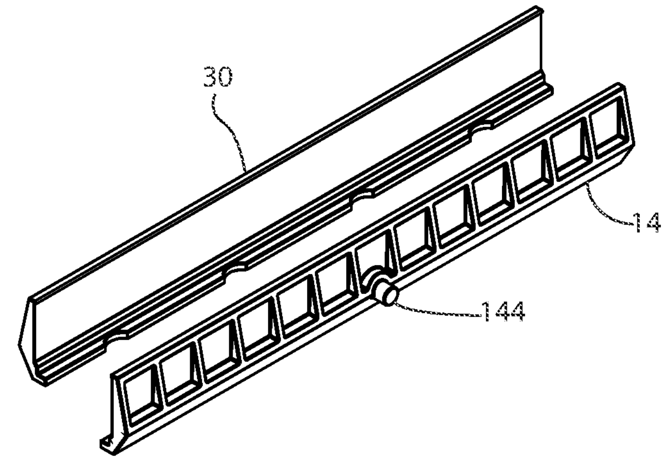
FIG. 3A is a perspective view of a clamping rail in accordance with the present invention.
Figure 3B:
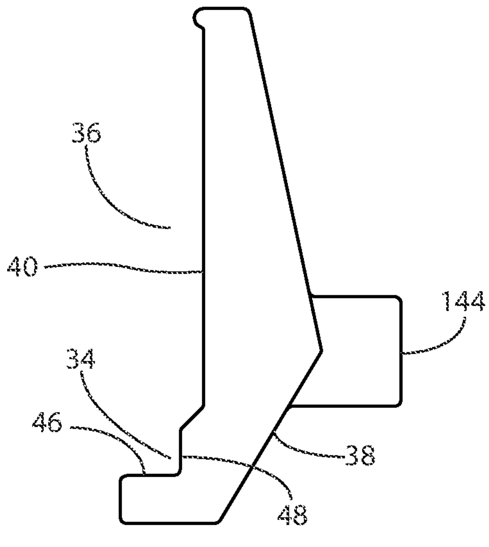
FIG. 3B is an end view of the clamping rail of FIG. 3A.
Figure 3C:
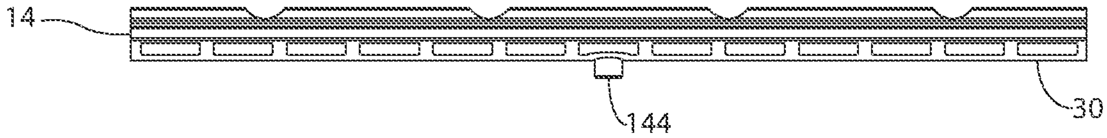
FIG. 3C is a top view of the core rail of FIG. 3A.
Figure 3D:
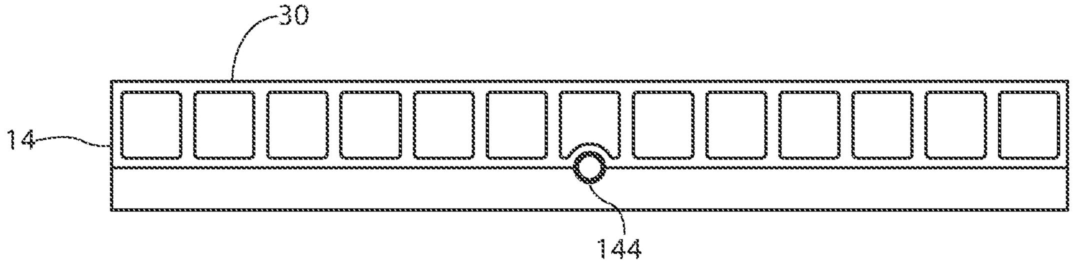
FIG. 3D is a side view of the core rail of FIG. 3A.
Figure 4A:
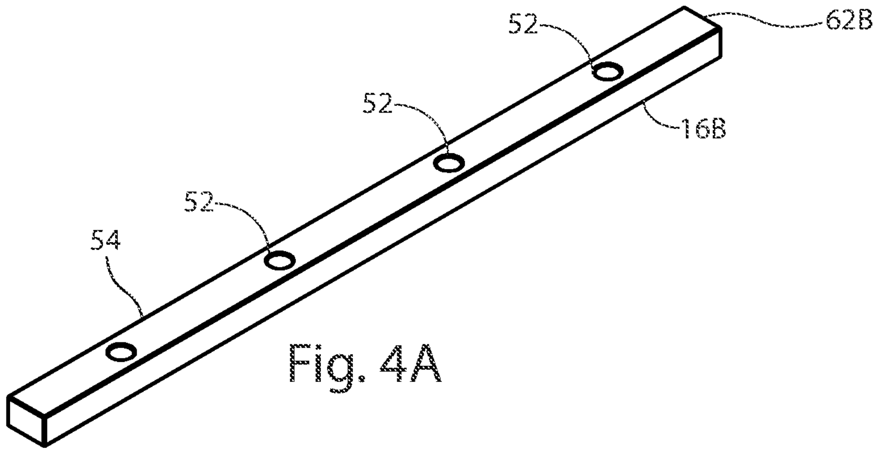
FIG. 4A is a perspective view of an exemplary embodiment of a pulling rail in accordance with the present invention.
Figure 4B:
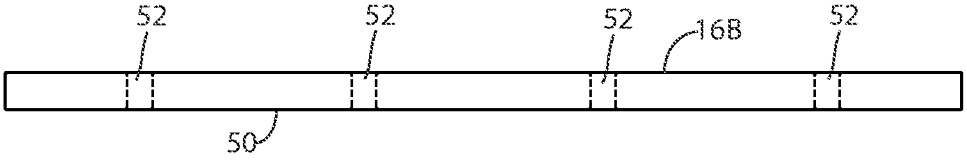
FIG. 4B is a side view of the pulling rail of FIG. 4A.
Figure 4C:
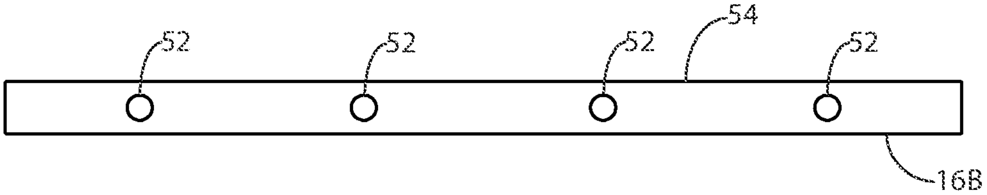
FIG. 4C is a top view of the pulling rail of FIG. 4A.
Figure 4D:
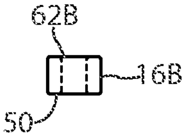
FIG. 4D is an end view of the pulling rail of FIG. 4A.
Figure 5A:
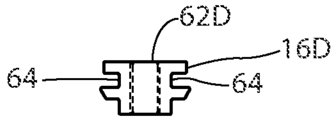
FIG. 5A is an exemplary cross-section for a pulling rail in accordance with the present invention, suitable for use with ¾-inch thick glass panels.
Figure 5B:
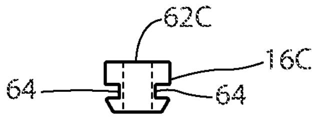
FIG. 5B is an exemplary cross-section for a pulling rail in accordance with the present invention, suitable for use with ⅝-inch thick glass panels.
Figure 5C:
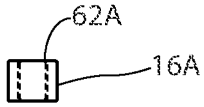
FIG. 5C is an exemplary cross-section for a pulling rail in accordance with the present invention, suitable for use with ⅜-inch thick glass panels.

In the embodiment shown in FIG. 3B, the holding recess 34 of each clamping rail 14 is defined in a side of the clamping rail 14 and has a vertical face 48 and a horizontal face 46. When the clamping rails 14 are installed mutually opposed within the clamping channel 20, the vertical faces 48 of the holding recesses 34 are mutually opposed, whereas the horizontal faces 46 are co-planer, i.e., at the same vertical height. In the embodiment shown in FIG. 1B, the horizontal faces 46 of the clamping recesses 34 bear against a horizontal face 50 of the pulling rail 16 and serve to support the pulling rail 16 within the clamping channel 20.

The pulling rail 16 includes one or more threaded holes 52 spaced along a longitudinal length 54 of the pulling rail 16.

(See FIGS. 4A-4D.) The core rail 12 includes one or more through-holes 56 spaced along the longitudinal length 21 of the rail 12. (See FIGS. 2A-2D.) The core rail 12 and the pulling rail 16 are configured such that one or more through-holes 56 in the core rail 12 are vertically aligned with one or more corresponding threaded holes 52 in the pulling rail 16. One or more clamp bolts 18 are inserted into such aligned through-holes 56 in the core rail 12 and are threaded into each of such threaded holes 52 of the pulling rail 16.

Figure 1B:
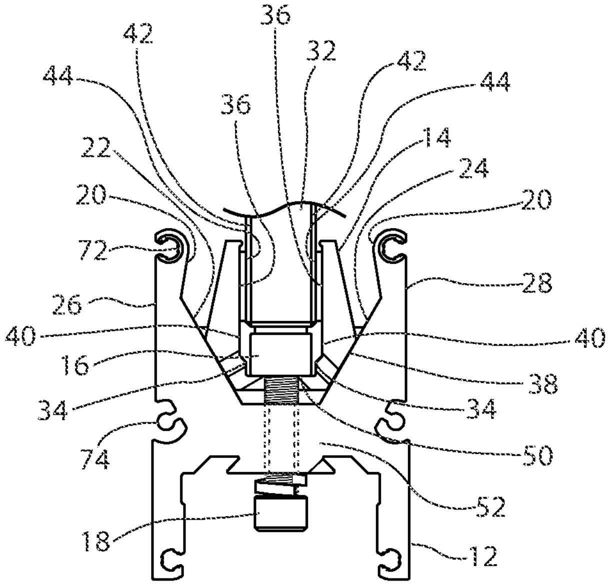
FIG. 1B is a representative end view of the door rail of FIG. 1A with the end cap and side covers removed for clarity.

With reference to FIG. 1B, when the one or more clamp bolts 18 are rotated, the pulling rail 16 is pulled in a driven direction which in turn causes the clamping rails 14 upon which the pulling rail 16 is secured or rests to be pulled or moved in the driven direction within the clamping channel 20 of the core rail 12. Due to the inclined guiding surfaces 38 of the clamping rail 14 sliding upon the respective left and right inclined surfaces, 22 and 24, of the clamping channel 20, the clamping rails translate or move inwardly towards each other, i.e., in a transverse or perpendicular direction, in addition to moving in the driven direction. The inward movement of the clamping rails 14 is resisted by the panel 32, i.e., the vertical faces 40 of the clamping recesses 36 of the clamping rails 14, as shown in the figures, bear against compression element 44 causing a clamping force to be exerted on vertical faces 42 of the panel 32. In various embodiments, the one or more clamp bolts 18 may be tightened to a predetermined torque which produces a predetermined clamping pressure sufficient to secure the panel 32 in the core rail 12, without damaging the panel.

With reference to FIGS. 1D-1H, the door rail system 10 of the present invention is able to accommodate a wide range of panel thicknesses and rail sizes by using interchangeable, modular components. For example, ⅜-inch, ½-inch, ⅝-inch and ¾-inch thick panels 32 can be installed using the same core rail 12, clamping rails 14, clamp bolts 18, and weather seals 60 (collectively, the "Common Parts"). When the Common Parts are mixed with square or tapered 4-inch, 6-inch, or 10-inch height side covers 58 having brushed stainless, black bronze, polished brass, polished stainless, or satin anodized finishes (which, in some embodiments, may require the attachment of cladding to the side covers 58), there are up to 120 possible combinations (i.e., 4 panel thicknesses times 2 side-cover profiles times 3 side-cover heights times 5 finishes). It will be appreciated by those of ordinary skill in the art that such side covers may comprise extruded aluminum with one or more sheets of cladding comprising different materials or finishes (including powder-coated, painted, or anodized surfaces) that are adhered or otherwise secured to the surface of the extruded aluminum side covers to achieve different aesthetics. For example, a sheet of polished brass or brushed stainless steel may be adhered to an aluminum side cover to achieve different colors, textures, or other appearances. More generally, other embodiments of the door rail system 10 may be designed to accommodate other panel thicknesses, side-cover profiles, side-cover heights, or finishes (with or without cladding) than those already described, so as to produce additional or alternative options that may offer an even greater number of possible combinations than those identified above. For any particular thickness of panel 32, only the pulling rail 16 and, in some instances, the compression element 44 need be changed. Generally, thicker panels require pulling rails of greater cross-sectional width than narrower panels and are sized accordingly. In certain embodiments, the pulling rails 16 and the clamping rails 14 may be configured with adequate spacing between the vertical face 48 of the clamping rails 14 and the sides of the pulling rail 16 to allow maximum tightening for a given thickness of panel 32. In other embodiments, the pulling rails 16 may be configured to prevent overtightening and resulting damage to a given thickness of panel 32 (e.g., a glass panel) by adjusting the cross-sectional dimensions of the pulling rail 16 or the clamping rails 14 such that the sides of the pulling rails 16 contact the vertical faces 48 of the opposing clamping rails 14 (so as to prevent further movement of the clamping rails 14 toward one another) after a desirable clamping force within an acceptable range for a particular panel thickness has been achieved. In various embodiments, a compression element of greater cross-sectional thickness may also be used.

Figure 1C:
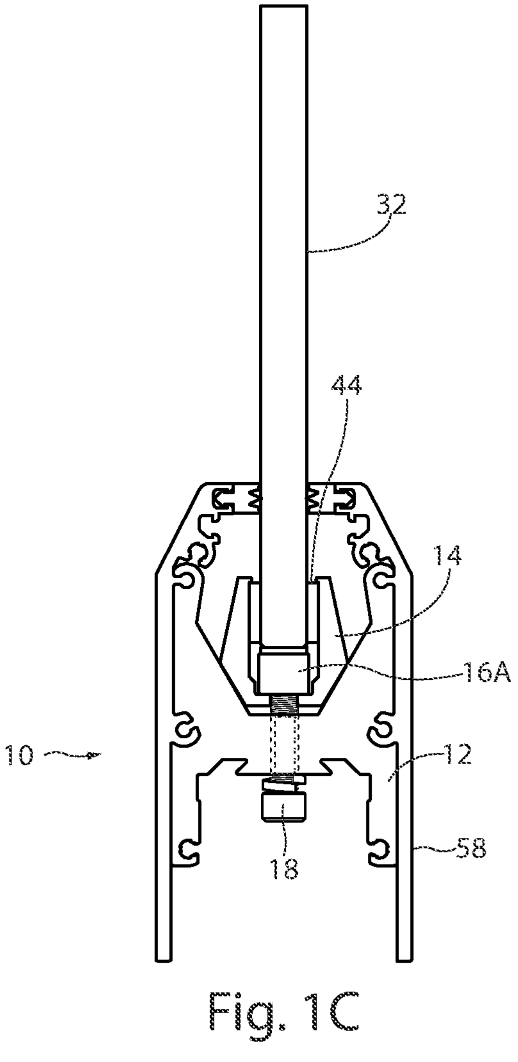
FIG. 1C is a representative end view of a door rail in accordance with the present invention, showing a ⅜-inch thick glass panel installed in the door rail.
Figure 1D:
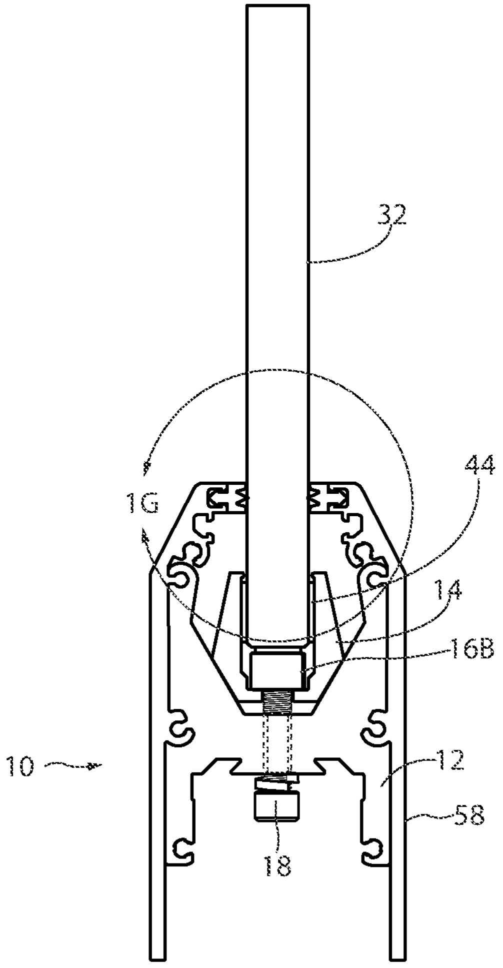
FIG. 1D is another representative end view of a door rail in accordance with the present invention, showing a ½-inch thick glass panel installed in the door rail.
Figure 1E:
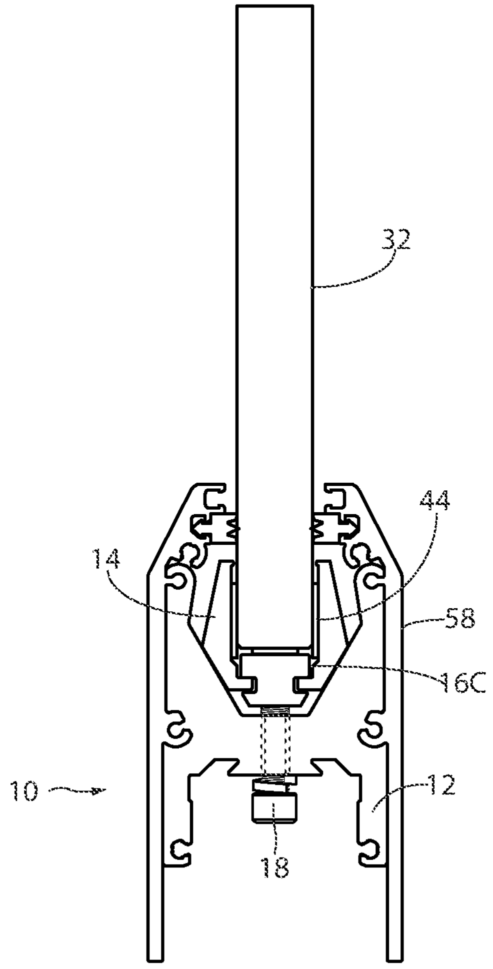
FIG. 1E is another representative end view of a door rail in accordance with the present invention, showing a ⅝-inch thick glass panel installed in the door rail.
Figure 1F:
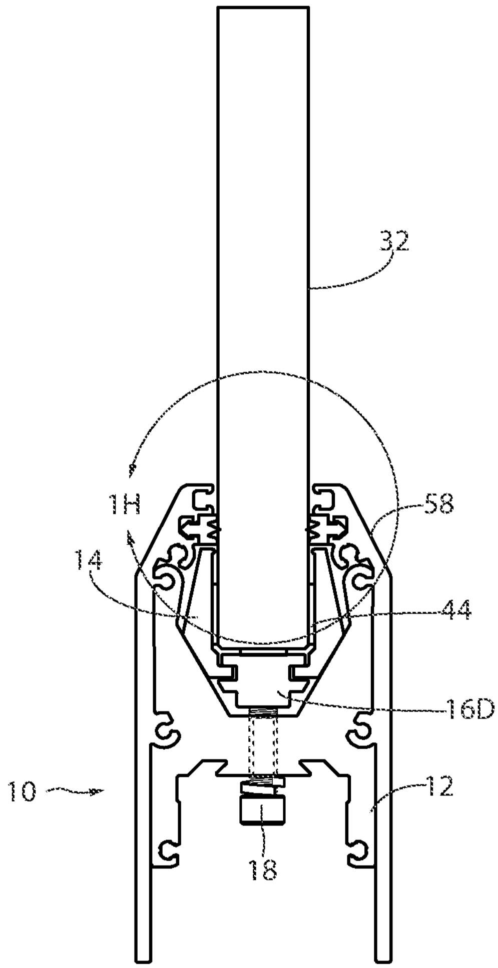
FIG. 1F is another representative end view of a door rail in accordance with the present invention, showing a ¾-inch thick glass panel installed in the door rail.
Figure 1G:
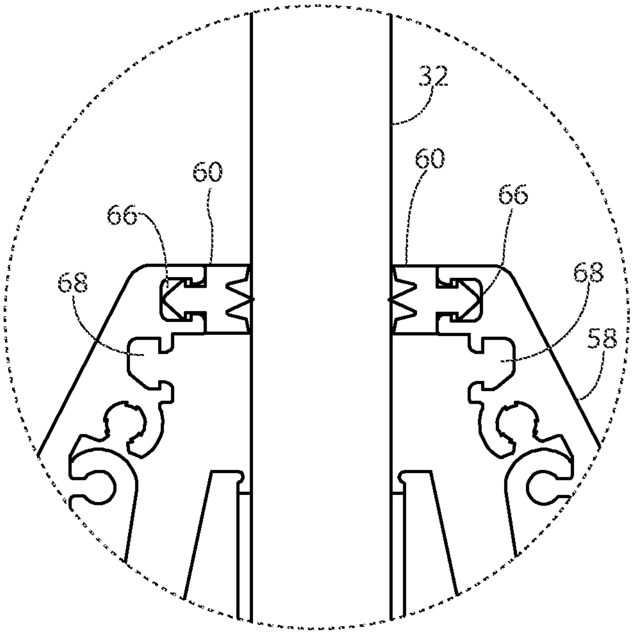
FIG. 1G is an enlarged detail view of the area shown in Circle G of FIG. 1D.
Figure 1H:
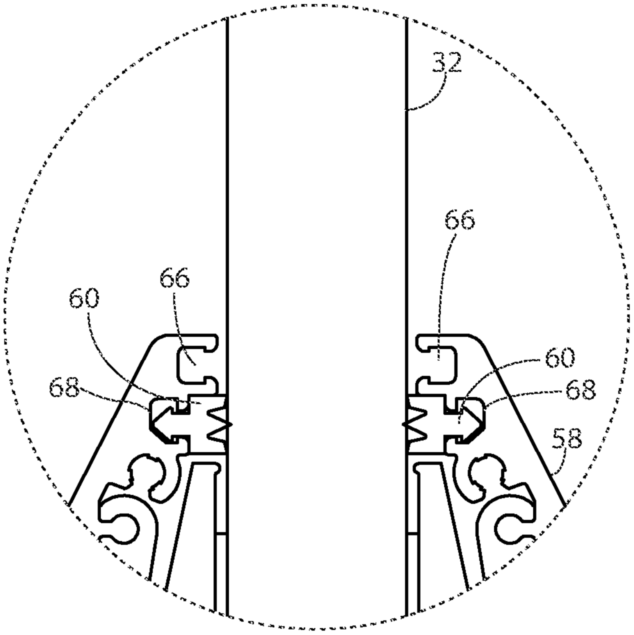
FIG. 1H is an enlarged detail view of the area shown in Circle H of FIG. 1F.
Figure 2A:
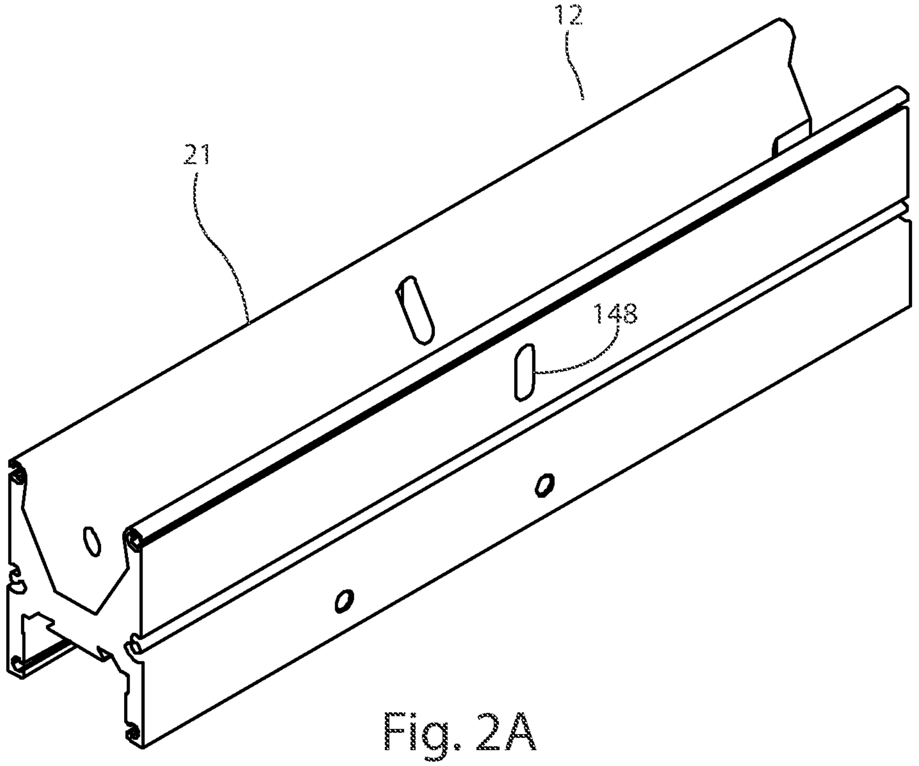
FIG. 2A is a perspective view of a core rail in accordance with the present invention.
Figure 2B:
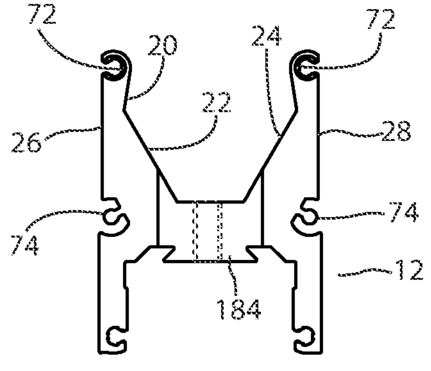
FIG. 2B is an end view of the core rail of FIG. 2A.
Figure 2C:
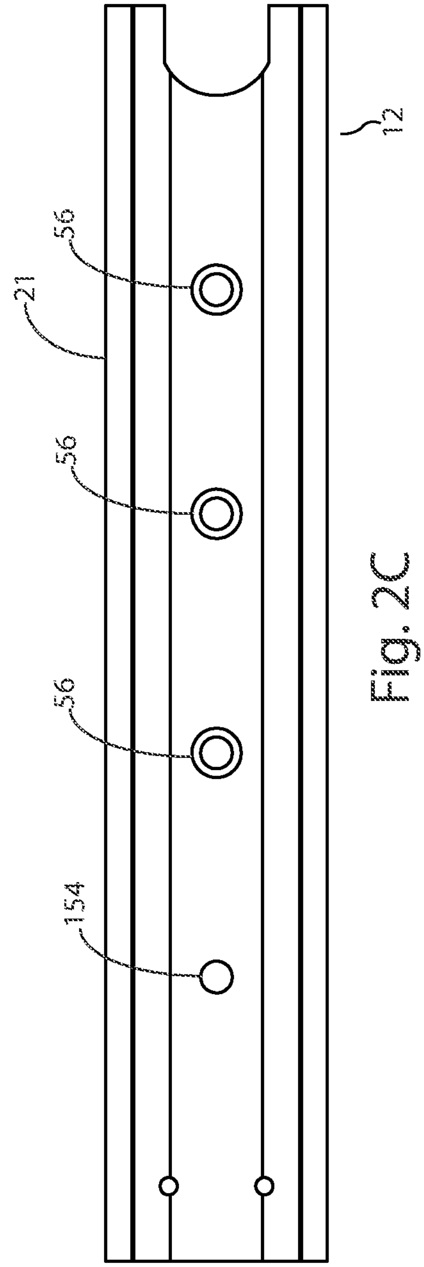
FIG. 2C is a bottom view of the core rail of FIG. 2A.
Figure 2D:
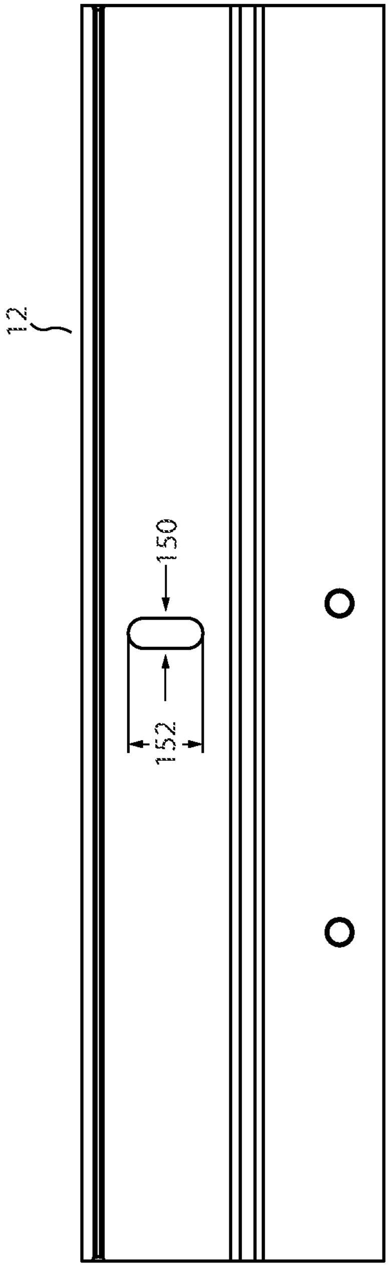
FIG. 2D is a side view of the core rail of FIG. 2A.

FIG. 1C illustrates a ⅜-inch panel installed in the door rail system 10. This installation requires the Common Parts, side covers 58, pulling rail 16A and compression element 44. FIG. 1D illustrates a ½-inch thick panel installed in the door rail system 10. This installation requires the Common Parts, side covers 58, pulling rail 16B and compression element 44. FIG. 1E illustrates a ⅝-inch thick panel installed in the door rail system 10. This installation requires the Common Parts, side covers 58, pulling rail 16C and compression element 44. FIG. 1F illustrates a ¾-inch thick panel installed in the door rail system 10. This installation requires the Common Parts, side covers 58, pulling rail 16D and compression element 44. It will be appreciated that, while FIGS. 1C-1F are shown with side covers 58, any side covers comprising various profiles, heights, finishes, or other features designed to engage with the Common Parts may be used, including side covers 58, 58A, 58B, and 58C shown in FIG. 6A.

With reference to FIGS. 1C to 1F, 4D and 5A-5C, the cross-sectional widths 62A, 62B, 62C and 62D of the pulling rails 16A, 16B, 16C and 16D vary to accommodate the ⅜-inch, ½-inch, ⅝-inch and ¾-inch thick panels, as shown in FIGS. 1C to 1F and in more detail in FIGS. 4D and 5A-5C. The wider pulling rails, 16C and 16D, are equipped with grooves 64 (see FIGS. 1E-1F and 5A-5B) which engage the faces 46 of the clamping rails 14, whereas with the narrower pulling rails, 16A and 16B, the pulling rails rest on the faces 46 of the clamping rails 14. (See FIGS. 1C, 1D, 4D and 5C.) The grooved cross-sections of pulling rails 16C and 16D, maintain the clamping rails 14 in a sufficiently low position within the clamping channel 20 of the core rail 12 to allow the same core rail, clamping rails and side covers to be used for each of the ⅜-inch, ½-inch, ⅝-inch and ¾-inch thick panel installations, as depicted in FIGS. 1C to 1F.

With reference to FIGS. 1C to 1H, in keeping with the desirability of reducing to a minimum the number of components that must be changed for each panel thickness, side covers 58 are equipped with upper 66 and lower 68 weather seal installation channels. The upper 66 and lower 68 weather seal installation channels allow a single weather seal 60 to be used commonly over a range of panel thicknesses, i.e., from ⅜-inch to ¾-inch thick panels. For ⅜-inch and ½-inch thick panels, the weather seals 60 are installed in the upper weather seal installation channels 66 of the side covers 58. The relatively inwardly facing position of the upper weather seal installation channels 66 with respect to the faces 42 of the panels 32, allows the upper weather seal installation channel 66 to accommodate both ⅜-inch and ½-inch thickness panels with a sufficiently compressible weather seal 60.

Similarly, for the ⅝-inch and ¾-inch thick panels, the weather seals 60 are installed in the lower weather seal installation channels 68. The relatively inward facing position of the lower weather seal installation channels 68, with respect to the faces 42 of the panels 32, allows the lower weather seal installation channel 68 to accommodate both ⅝-inch and ¾-inch thickness panels, again with a sufficiently compressible weather seal 60.

Figure 6A:
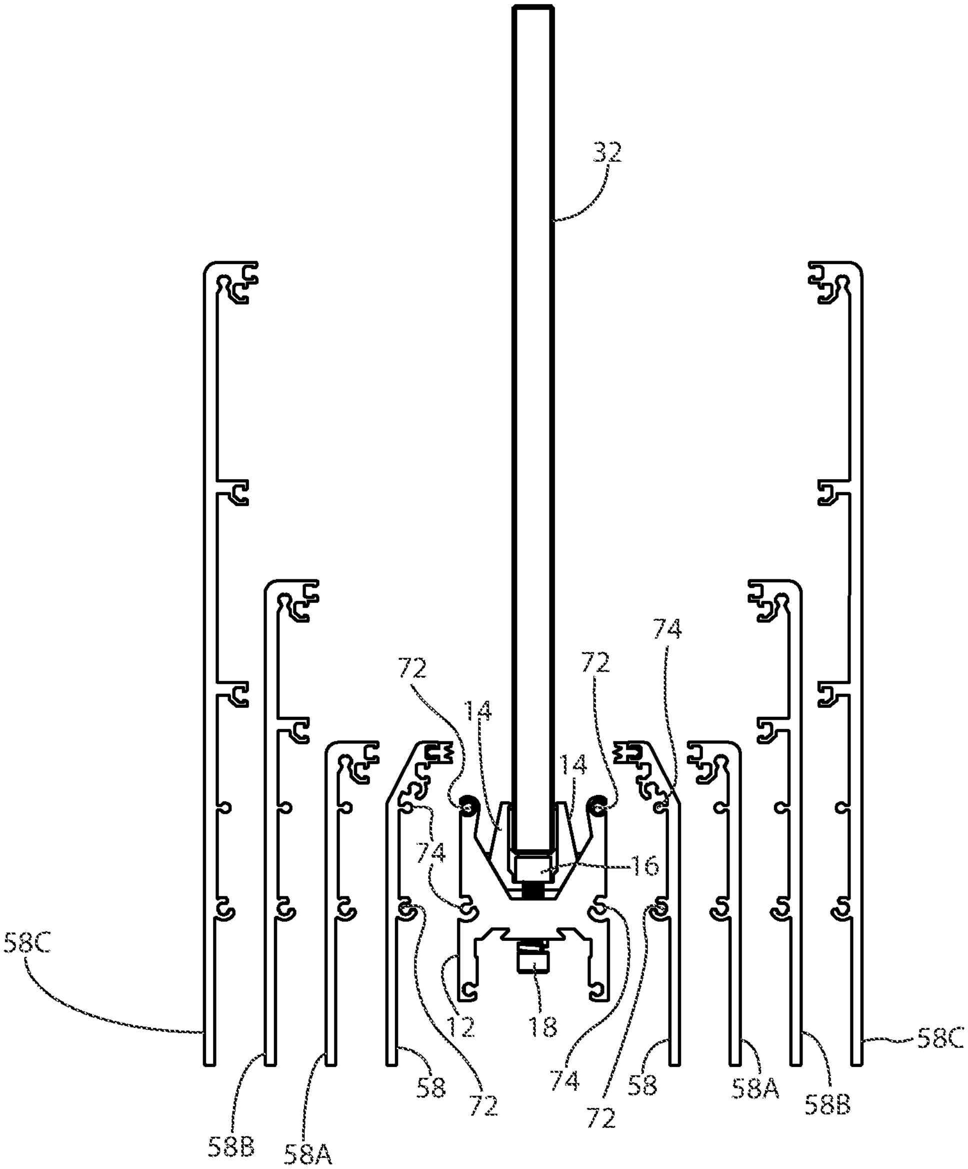
FIG. 6A is an end view of a representative door rail of the present invention showing representative examples of side covers that may be installed on the door rail.
Figure 6B:
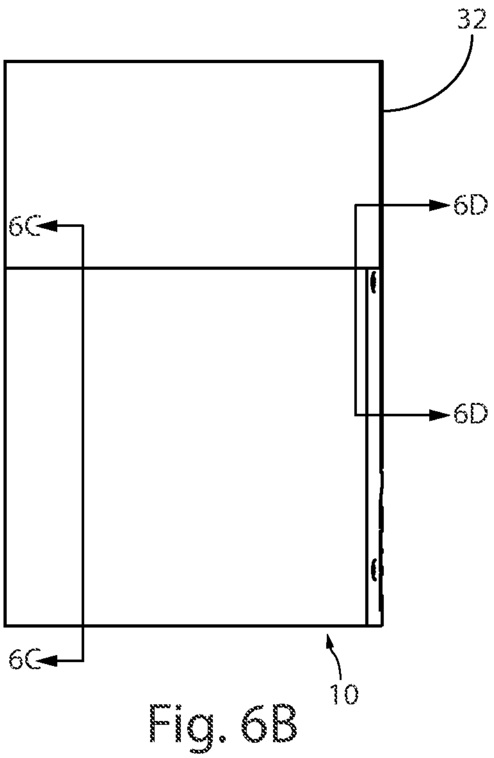
FIG. 6B is side view showing a representative portion of a door rail in accordance with the present invention.
Figure 6C:
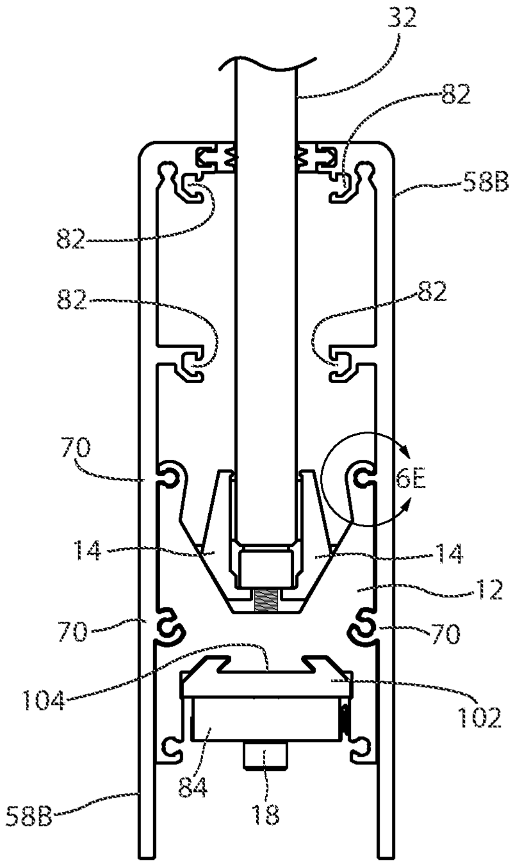
FIG. 6C is a cross-sectional view of the door rail of FIG. 6B taken along the line 6C-6C.

With reference to FIGS. 6A to 6C and 2B, the door rail system 10 of the present invention features modular side covers that are removably attachable to the core rail 12. It will be appreciated that any modular side covers may be used with the door rail system, regardless of the particular side covers shown or described in the figures. FIG. 6A depicts exemplary side cover profiles 58, 58A, 58B and 58C. The modular side covers 58, 58A, 58B, and 58C may be removably attachable to the core rail 12 by means of tongue and groove joints 70. (See FIG. 6C.) In one embodiment, the left and right sides, 26 and 28, of the core rail 12 each include a groove 72 and a tongue 74. Formed on each side cover 58 are corresponding grooves 72 and tongues 74. When the side covers 58 are installed on the core rail 12, the grooves 72 of the core rail 12 mate with the tongues 74 of the side covers 58 and, likewise, the tongues 74 of the core rail 12 mate with the grooves 72 of the side covers 58. That is, the tongues 72 formed on the core rail 12 and the side covers 58 slide within the corresponding grooves 74 formed on the core rail 12 and the side covers 58. By this mechanism, the modular side covers 58 may be readily slid on and off the core rail 12. It will be appreciated that any suitable number of grooves 72 and tongues 74 may be used and none, any, or all of the grooves 72 may be formed on the core rail 12.

Figure 6D:
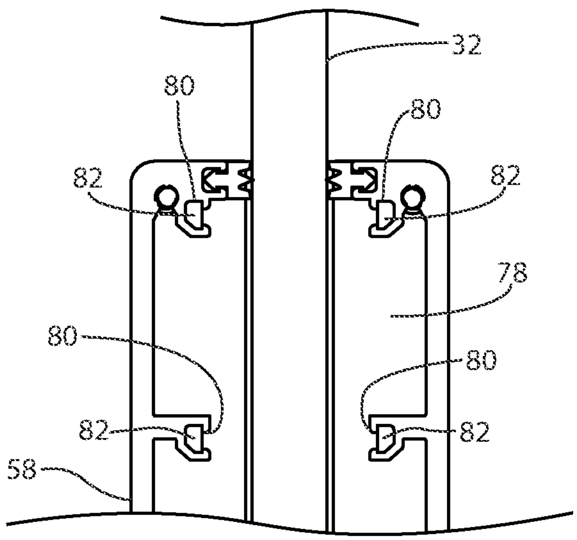
FIG. 6D is a partial cross-sectional view of a representative door rail of the present taken along the line 6D-6D of FIG. 6B.
Figure 6E:
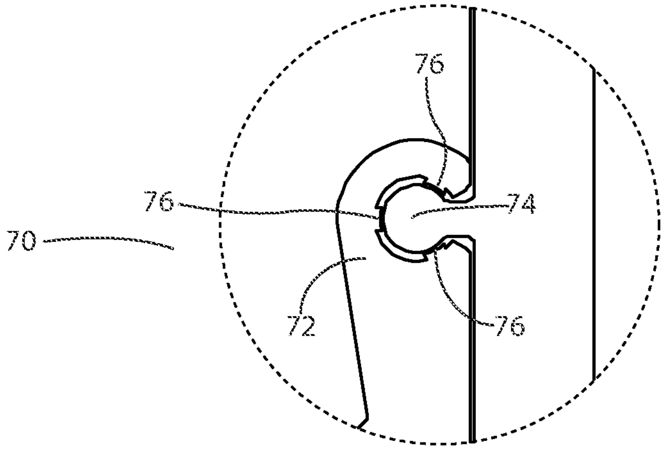
FIG. 6E is an enlarged detail view of the area within Circle 6E of FIG. 6C.

With particular reference to FIG. 6E, the respective grooves 72 of the core rail 12 and side covers 58 are longitudinal channels that extend the length of the core rail 12 and side covers 58 and are semicircular in interior shape or perimeter. Similarly, the respective tongues 74 of the core rail 12 and side covers 58 extend the length of the core rail 12 and side covers 58 and are semicircular in exterior shape or perimeter. One advantage of a semicircular shaped groove is that such shape corresponds to the circular motion of a countersink drill bit, which may be used remove any burrs or otherwise smooth any rough edges that might interfere with the insertion of a tongue 74 in a groove 72 or to provide a larger opening in the end of the groove 72 that transitions to a smaller channel within the groove 72 for ease of insertion of a tongue 74 into the end of the groove 72. In other embodiments, the respective grooves 72 of the core rail 12 and side covers 58 and the respective tongues 74 of the core rail 12 and side covers 58 may not extend the length of the core rail 12 or the side covers 58 and may have a different exterior shape or perimeter. For example, the core rail 12 and side covers 58 may have one or more grooves 72 that do not run the length of the core rail 12 or the side covers 58 and contain one or more sections with openings capable of receiving a corresponding tongue 74 from a non-parallel direction (e.g., from an approximately perpendicular direction) to the length of the core rail 12 or the side covers 58, such that the tongue 74 may be inserted into the groove 72 and slid in the direction of the longitudinal channel to secure the tongue 74 within a section of the groove 72 that does not allow the tongue 74 to be readily removed from such non-parallel direction (e.g., as shown in FIG. 6E).

In certain embodiments, one or more protrusions 76 may be formed on the interior perimeter of one or more grooves 72. In the exemplary embodiment of FIG. 6E, three protrusions 76 are spaced about a semicircular interior perimeter of the groove 72. The protrusions 76 serve to reduce friction between the grooves 72 and the tongues 74. The protrusions 76 may be positioned such that the tongue 74 contacts only the protrusions 76 of the groove 72 when the tongue 74 is mated with the groove 72, i.e., when the tongues are slid within the grooves 72 upon installation of the side covers 58 on the core rail 12. The point contact between the tongues 74 and the protrusions 76 of the grooves 72 substantially reduces friction and thereby allows the side covers 58 to be readily slid on or off the core rail 12. Friction may also be reduced by inserting one or more sleeves comprised of one or more materials having a low coefficient of friction (e.g., polytetrafluoroethylene (PTFE) or Teflon®) within one or more grooves 72, such that the tongues 74 may slide within such sleeves. Any such sleeve may be secured within groove 72 by friction fit, adhesive, or any other suitable means (e.g., a rim, an end cap, a wall, or other mechanical barrier at one end) to avoid movement of the sleeve when the tongue 74 is slid inside of it. In certain embodiments, one or more protrusions 76 may be formed on the interior perimeter of the one or more sleeves.

Figure 6F:
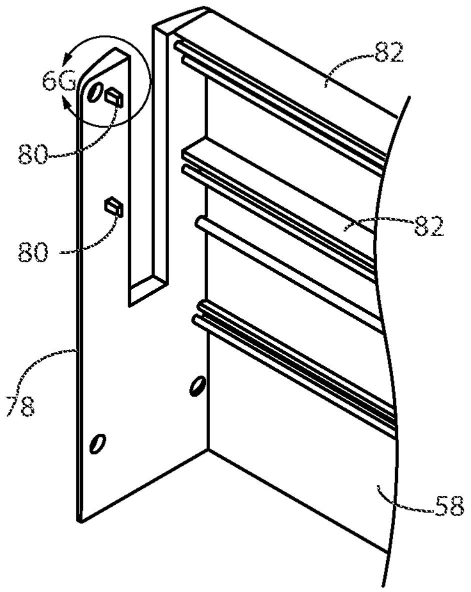
FIG. 6F is a perspective view a representative cover plate connected to representative side cover.
Figure 6G:
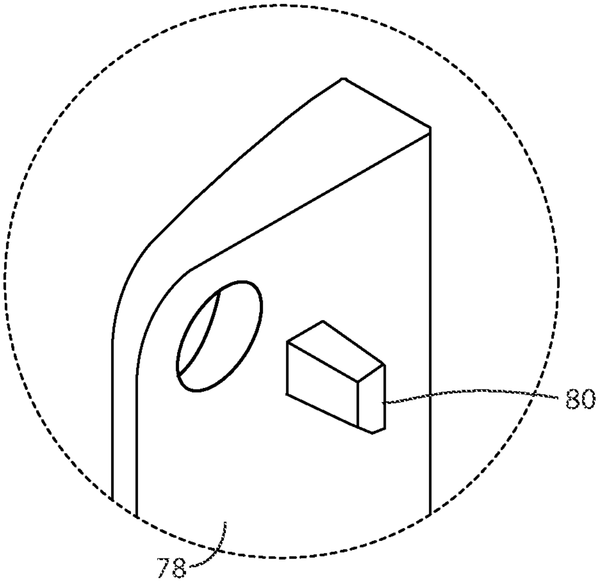
FIG. 6G is an enlarged detail view of the area within Circle 6G of FIG. 6F.

With reference to FIGS. 6D, 6F and 6G, an end cap 78 in accordance with the present invention is depicted. End caps 78 are used to close out the ends of a door rail assembly 10 in order to provide a more pleasing aesthetic appearance. The end caps 78 include prongs 80 which are configured to be a press fit within retention receptacles 82 which are formed in the modular cladding 58. In the exemplary embodiment, the retention receptacles 82 are channels.

With reference to FIGS. 7A to 7H, an angular alignment device 84 in accordance with the present invention is depicted. The angular alignment device 84 includes a core rail interface member 86, an angular adjustment member 88, a pivot bushing 90, an end cap or axial adjustment member 92, an axial adjustment screw 94, and, a spring-loaded plunger 96.

The core rail interface member 86 includes a dovetail slot 98, a pivot cylinder 106, a threaded hole 112 at an aft end 114, and a bore 118 at a forward end 116 and an access slot 132. The angular adjustment member 88 has an aft end 122 and a forward end 120. A detent 108 is provided at the forward end 120 and a clearance slot 124 is provided at the aft end 122. At a center of the angular adjustment member 88 is a bore 110 configured to accept the pivot bushing 90. The end cap 92 includes a pocket 126 that is configured to accept the head of the axial adjustment screw 94 and has a clearance hole 128 in an aft side 130, which allows a tool (T-handle wrench) to access the head of the axial adjustment bolt. The end cap 92 also includes a pair of through holes 132, which allow the end cap 92 to be fixed to the core rail 12 via screws 138.

The angular alignment device 84 is assembled by pressing the pivot bushing 90 into the bore 110 of the angular adjustment member 88. The angular adjustment member 88 and pivot bushing 90 are then pressed over the pivot cylinder 106 of the core rail interface member 86. Subsequently, the spring-loaded plunger 96 is inserted and retained in the hole 118 located in the forward end 116 of the core rail interface member 86. The spring-loaded plunger 96 is inserted until an end of the plunger engages the detent 108 in the angular adjustment member 88. The detent 108 indicates when the angular adjustment member 88 is in a zero degree or centered position. Angular adjustment causes the detent 108 to move away from the end of the spring-loaded plunger 96. If re-centering of the angular adjustment member 88 is desired, an installer may find the centered or neutral position of the angular adjustment member 88 by moving the member through its range of motion until the detent 108 again engages the end of the spring-loaded plunger 96.

Assembly of the angular alignment device 84 is completed by partially threading the axial adjustment screw 94 into the threaded hole 112 at the aft end 114 of the alignment device 84 and pressing the end cap 92 over the head of the screw 94.

The angular alignment device 84 is installed in a core rail as follows. The core rail interface member 86 interfaces with the core rail 12 by means of a sliding dovetail joint 102. (See FIG. 6C.) To form the sliding dovetail joint 102, the dovetail slot 98 of the core interface rail interface member 86 is slid over a dovetail 104 formed in the core rail 12. (See FIGS. 2B and 6C). The alignment device 84 is slid onto the core rail 12 until the through holes 132 of the end cap 92 are aligned with threaded holes 136 which have been predrilled into an end of the core rail 12. (See FIG. 7G.) The end cap 92 is secured to the core rail 12 by means of screws 138 which pass through the through-holes 132 of the end cap 92 and engage the threaded holes 136 in the core rail 12. Once, the angular alignment device 84 is installed in the core rail 12, set screws 140, which are used for angular alignment, are installed in threaded holes 141 predrilled in the side of the core rail 12.

The angular alignment device 84 may also be equipped with an axial alignment limiting feature which comprises a limiting screw 153, (see FIG. 7H), which threads into a threaded hole 154 in the core rail 12. (See FIG. 2C.) The head of the screw 153 protrudes into slot 157 formed in the rail interface member 86. The length of the slot 157 serves to limit the axial, i.e. forward and aft, movement of the rail interface member 86 within the core rail 12 with respect to the end cap 92, which is fixed to the core rail 12. Without the slot 157 and limiting screw 153, over adjustment of the axial adjustment screw 94 could lead to separation of the core rail interface member 86 from the end cap 92.

Figure 7A:
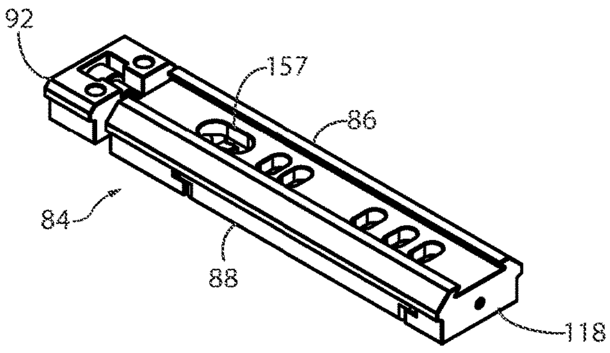
FIG. 7A is a perspective view of an angular adjustment device in accordance with the present invention.
Figure 7B:
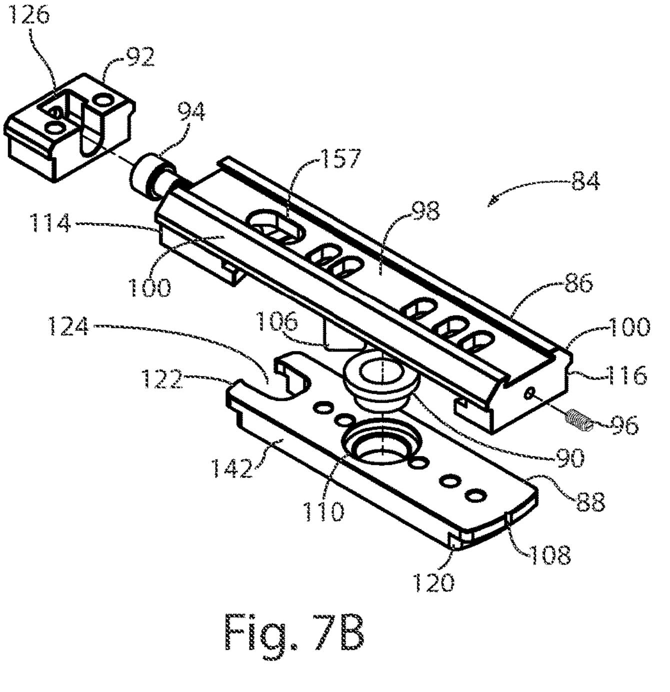
FIG. 7B is an exploded perspective view of the angular adjustment device of FIG. 7A.
Figure 7C:
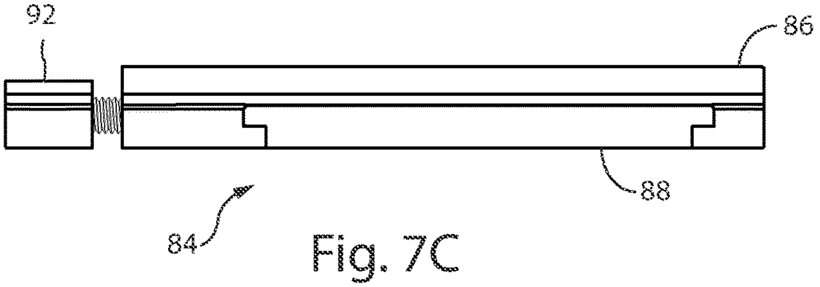
FIG. 7C is a side view of the angular adjustment device shown in FIG. 7A.
Figure 7D:
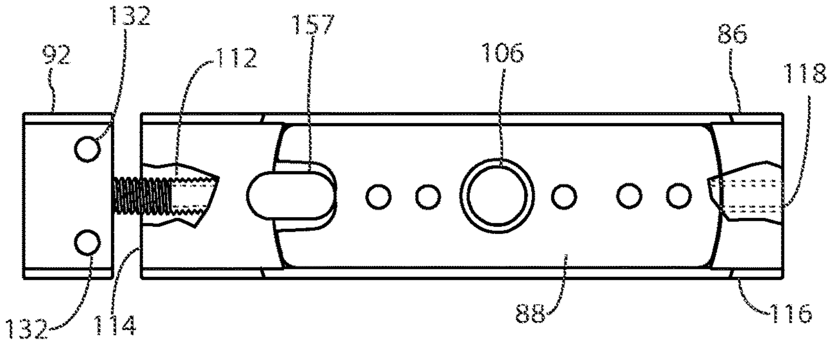
FIG. 7D is a bottom view of the angular adjustment device shown in FIG. 7A.
Figure 7E:
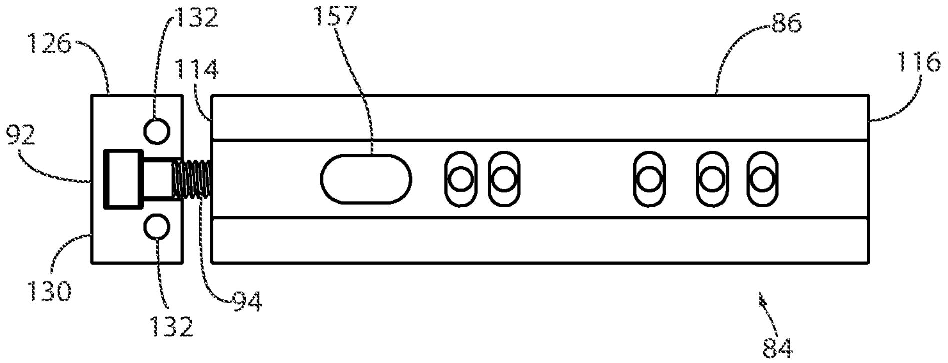
FIG. 7E is a top view of the angular adjustment device shown in FIG. 7A.
Figure 7F:
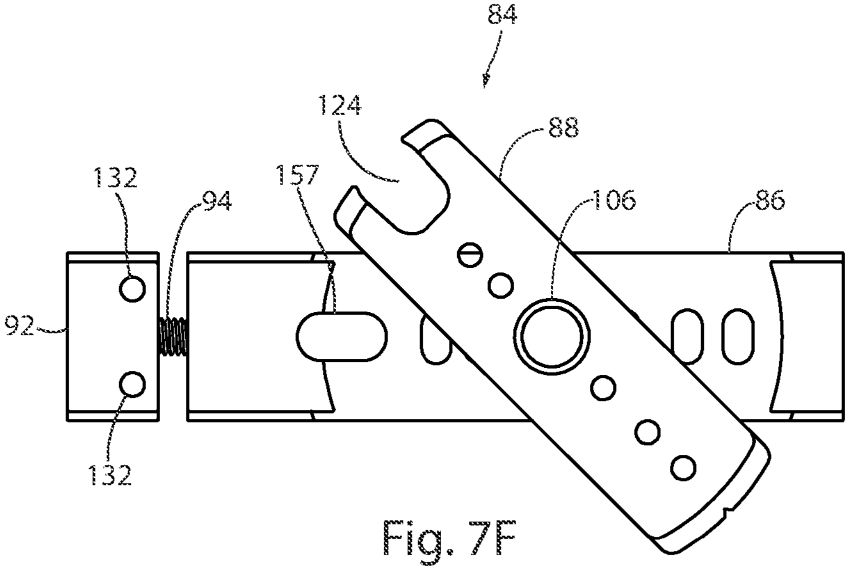
FIG. 7F is a bottom view of the angular adjustment device shown in FIG. 7A, with a pivot portion shown in a rotated position for the purpose of illustration.
Figure 7G:
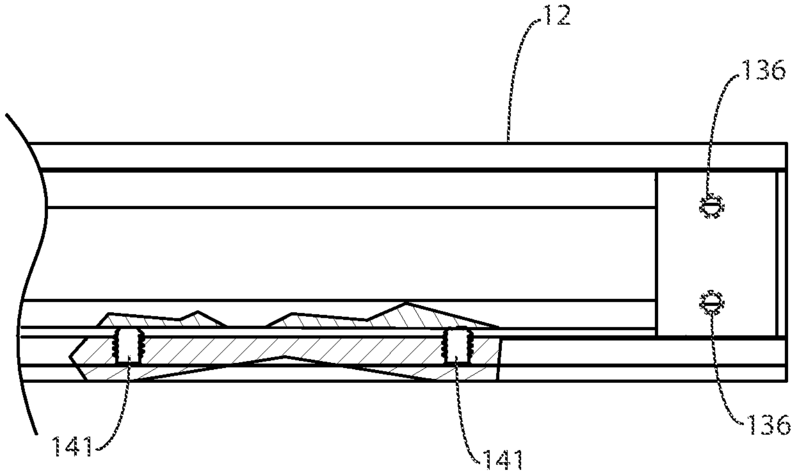
FIG. 7G is a partial bottom view of an end of a representative core rail in accordance with the door rail system of the present invention.
Figure 7H:
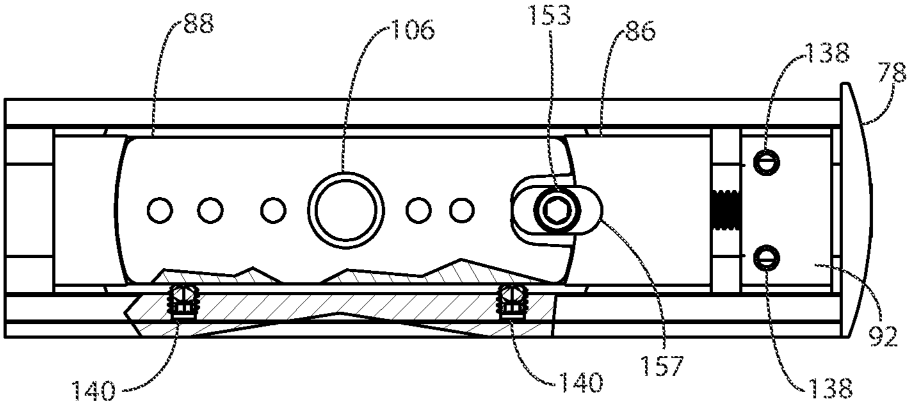
FIG. 7H is a partial bottom view of the door rail of FIG. 6B, showing the angular adjustment device of FIG. 7A installed in the door rail.
Figure 7I:
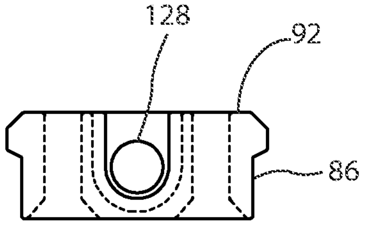
FIG. 7I is an end view of the angular adjustment device shown in FIG. 7A.
Figure 7J:
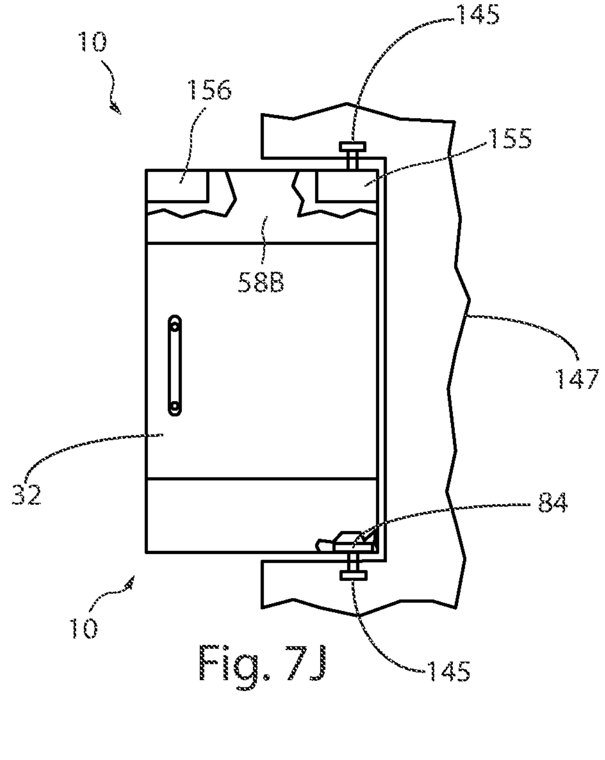
FIG. 7J is a schematic representation of a door featuring the door rail system of the present invention installed in a doorway.

Door rails in accordance with door rail system 10 of the present invention may be installed as both upper and lower door rails. Therefore, the angular alignment device 84 may be installed in one or both of the upper or lower door rails as may be present in any particular door installation. In either case, door pivots 145 of a door jamb 147 which support the door are vertically aligned with the pivot cylinder 106 of the core rail interface member 86. Axial alignment, i.e., adjusting the door inward or outward with respect to a door pivot 145 is accomplished with the axial adjustment bolt 94, which, in the exemplary embodiment, is a socket head cap screw. A commercially available T-Handle adjustment tool is used to rotate the axial adjustment screw 94. Access to the head of the bolt is made via the access hole 128 formed in the end cap 92. An exemplary installation of the door rail system 10 is shown in FIG. 7J with a door handle located toward the left edge of the door and two door pivots 145 located toward the right edge of the door. Rotation of the axial adjustment screw 94 in one direction (e.g., clockwise) moves the left edge of the door farther from the door pivot 145 and rotation in the opposite direction (e.g., counterclockwise) moves the left edge of the door closer to the door pivot 145.

Angular adjustment of a door rail is accomplished by rotating the set screws 140. The set screws 140 bear against a side 142 of the angular adjustment member 88. The set screws are spaced apart on both sides of the pivot bore 110 so as to allow the door rail to be angularly adjusted relative to a door pivot 145 in either a clockwise or counterclockwise direction. In other embodiments, the set screws 140 may be located on opposite sides of the angular adjustment member 88 and spaced together on the same side of the pivot bore 110 (e.g., directly across from one another) so as to allow such angular adjustment. However, locating the set screws 140 on the same side of angular adjustment member 88 allows for angular adjustment to be accomplished without having to switch from one side of the door to the other. In various embodiments, one of the set screws 140 may be replaced by a spring, including a plunger or other spring-loaded device, that exerts a force on the angular adjustment member 88 sufficient to maintain the angular adjustment member 88 in the desired angular position when the door is closed.

Figure 8A:
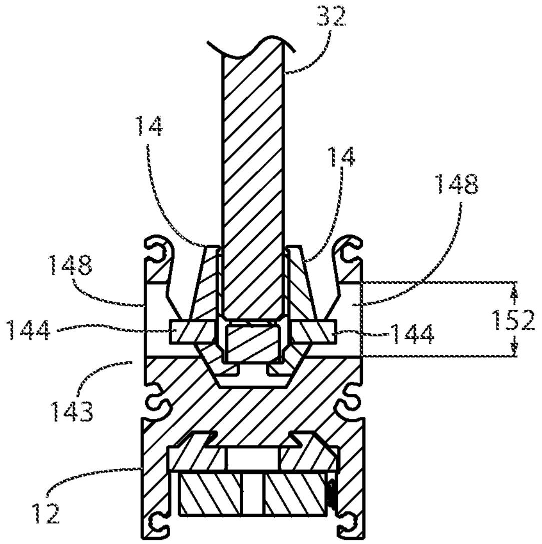
FIG. 8A is a representative cross-section of the door rail system of the present invention, with the side covers removed, showing the use of optional shear pins to retain the clamping rails within the core rail.

With particular reference to FIG. 8A, as well as FIGS. 2A-2D and 3A-3D, the door rail assembly 10 of the present invention may, optionally, be equipped with shear pins 144 that keep the clamping rails 14 from moving longitudinally within the core rail 12, i.e., from sliding out of the core rail 12. To form a shear pin joint 143, a shear pin 144 is installed in each clamping rail 14. A blind bore 146 may be provided in each clamping rail 14 for receipt of a shear pin or a shear pin may be integrally formed (i.e. cast) as part of each camping rail 14.

For receipt of each shear pin 144 disposed in each clamping rail 14, a slot 148 is formed in right and left walls of the clamping channel 20 of the core rail 12. The width 150 (see FIG. 2D) of the slot 148 is configured to be a slip fit with the diameter of the shear pin 144. This relatively tight fit prevents the clamping rails from translating or moving longitudinally within the core rail 12. The vertical or clearance height 152 of the slot 144 is configured to provide clearance for the shear pin 144 allowing it to move upwardly and downwardly within the slot 148. The clearance height 152 serves two purposes. First, it prevents the shear pins 144 from contacting the bottom of the slot 148 as the clamping rails 14 are pulled in the driven direction upon tightening of the clamp bolts 18 to secure a panel 32. Second, the clearance height 152 allows each of the clamping rails 16A-16D (see FIGS. 1C-1F) to be used with the same core rail 12. The clearance height 152 is required as each pulling rail 16A-16D places the clamping rails 14 at a different vertical position within the clamping channel 20 of the core rail 12.

With reference to FIG. 7J, it should be noted that the core rail 12 and associated clamping rails 14 and pulling rail 16 need not necessarily span the entire width of a door panel 32. Rather sections of rail assemblies can be used at each end of the door panel 32. For example, an aft door rail section 155 and a forward door rail section 156 may be used, with only the side covers 58 spanning the full width of the panel. (For reference, an “aft section” refers to a rail section at end of the panel adjacent to the door jamb, whereas a “forward section” refers to a rail section adjacent the free end of the door panel.) Moreover, where a fully supported door panel 32 is desired, the rail sections may comprise aft, forward and center sections, where the aft and forward sections accommodate special features. For example, a forward rail section may accommodate door locks and an aft rail section may accommodate alignment devices or door closer arms.

The core rail 12, clamping rails 14 and pulling rails 16 may be made from variety of metallic materials with aluminum extrusions and castings generally being preferred for their combination of strength, light weight and ease of manufacturing. Structural plastics may also be suitable. The cladding may comprise a variety of materials with brushed or polished stainless steel, powder coated or painted steel, and anodized, powder coated or painted aluminum, being the most common.

It will be appreciated that an improved door rail system featuring: the ability to accommodate multiple thicknesses of panels, modular side covers, an angular adjustment device, and a shear pin connection between the core rail and the pulling rails has been provided. While the present invention has been described with regards to particular embodiments, it is recognized that additional variations of the present invention may be devised without departing from the inventive concept.

What is claimed is:

1. An alignment device for aligning a door rail with respect to a door jamb, comprising:

an interface member, an angular adjustment member, and, an axial adjustment member;

the interface member being connectable to the door rail;

the angular adjustment member being pivotally connected to the interface member and connectable to a door pivot;

the axial adjustment member being connected to the interface member such that the interface member is axially moveable inwardly and outwardly with respect to the axial adjustment member;

wherein, when the alignment device is installed within the door rail, the interface member is slidable within the door rail and the axial adjustment member is fixed to the door rail;

wherein, when the alignment device is installed in the door rail and the angular adjustment member is connected to a door pivot, the door rail can be moved axially inward and outward with respect to the door pivot by causing the interface member to move relative to the axial adjustment member; and wherein, set screws installed in the door rail are configured to bear against an edge of the angular adjustment member and to be equidistantly spaced about the door pivot, such that adjustment of the set screws angularly moves the door rail with respect to the door pivot.

2. The rail system for securing a panel of claim 1, wherein the angular alignment device further includes a detent on an end of the angular adjustment member that interfaces with a spring loaded plunger in the interface member, wherein the detent is configured to indicate a zero degree setting of the alignment device.

* * * * *